United States Patent
Luo et al.

(10) Patent No.: US 10,966,193 B2
(45) Date of Patent: *Mar. 30, 2021

(54) WIRELESS DEVICES AND SYSTEMS INCLUDING EXAMPLES OF CONFIGURATION MODES FOR BASEBAND UNITS AND REMOTE RADIO HEADS

(71) Applicant: MICRON TECHNOLOGY, INC., Boise, ID (US)

(72) Inventors: Fa-Long Luo, San Jose, CA (US); Jaime Cummins, Bainbridge Island, WA (US); Tamara Schmitz, Scotts Valley, CA (US); Jeremy Chritz, Seattle, WA (US)

(73) Assignee: Micron Technology, Inc., Boise, ID (US)

( * ) Notice: Subject to any disclaimer, the term of this patent is extended or adjusted under 35 U.S.C. 154(b) by 178 days.

This patent is subject to a terminal disclaimer.

(21) Appl. No.: 16/048,075

(22) Filed: Jul. 27, 2018

(65) Prior Publication Data
US 2018/0359744 A1    Dec. 13, 2018

Related U.S. Application Data

(63) Continuation of application No. 15/447,699, filed on Mar. 2, 2017, now Pat. No. 10,070,432.

(51) Int. Cl.
  *H04W 72/04*   (2009.01)
  *H04W 88/08*   (2009.01)
(52) U.S. Cl.
  CPC ..... *H04W 72/0433* (2013.01); *H04W 88/085* (2013.01); *Y02D 30/70* (2020.08)
(58) Field of Classification Search
  CPC .................. H04W 72/0433; H04W 88/085
  See application file for complete search history.

(56) References Cited

U.S. PATENT DOCUMENTS 6,580,721 B1    6/2003    Beshai
8,583,063 B1    11/2013   Lee et al.
(Continued)

FOREIGN PATENT DOCUMENTS

EP    2635087 A1    9/2013
TW    201545574 A   12/2015
(Continued)

OTHER PUBLICATIONS

PCT Application No. PCT/US18/20306 titled "Wireless Devices and Systems Including Examples of Configuration Modes for Baseband Units and Remote Radio Heads", filed Feb. 28, 2018.
(Continued)

*Primary Examiner* — Samina F Choudhry
(74) *Attorney, Agent, or Firm* — Dorsey & Whitney LLP

(57) ABSTRACT

Examples described herein include systems and methods which include wireless devices and systems with examples of configuration modes for baseband units (BBU) and remote radio heads (RRH). For example, a computing system including a BBU and a RRH may receive a configuration mode selection including information indicative of a configuration mode for respective processing units of the BBU and the RRH. The computing system allocates the respective processing units to perform wireless processing stages associated with a wireless protocol. The BBU and/or the RRH may generate an output data stream based on the mixing of coefficient data with input data at the BBU and/or the RRH. Examples of systems and methods described herein may facilitate the processing of data for 5G wireless communications in a power-efficient and time-efficient manner.

20 Claims, 8 Drawing Sheets

(56) References Cited

U.S. PATENT DOCUMENTS

| | | | |
|---|---|---|---|
| 9,112,758 B2 | 8/2015 | Niu et al. | |
| 9,634,615 B1* | 4/2017 | Ahmed | H03F 1/0288 |
| 10,070,432 B1 | 9/2018 | Luo et al. | |
| 2006/0256216 A1 | 11/2006 | Takahiko et al. | |
| 2007/0201582 A1* | 8/2007 | Okada | H04L 5/06 |
| | | | 375/308 |
| 2010/0297957 A1 | 11/2010 | Rofougaran | |
| 2011/0151812 A1 | 6/2011 | Kang et al. | |
| 2012/0081566 A1* | 4/2012 | Cote | H04N 5/225 |
| | | | 348/222.1 |
| 2013/0241757 A1* | 9/2013 | Morris | H04B 1/0007 |
| | | | 341/144 |
| 2014/0194158 A1 | 7/2014 | Gong et al. | |
| 2015/0372738 A1 | 12/2015 | Negus et al. | |
| 2016/0254889 A1* | 9/2016 | Shattil | H04L 12/2854 |
| | | | 370/329 |
| 2016/0330630 A1* | 11/2016 | Yoo | H04L 1/16 |
| 2017/0230780 A1 | 8/2017 | Chincholi et al. | |
| 2018/0255546 A1 | 9/2018 | Luo et al. | |
| 2018/0255552 A1 | 9/2018 | Luo et al. | |
| 2020/0305161 A1 | 9/2020 | Luo et al. | |

FOREIGN PATENT DOCUMENTS

| | | |
|---|---|---|
| TW | 201611560 A | 3/2016 |
| WO | 2005008926 A1 | 1/2005 |
| WO | 2016099748 A1 | 6/2016 |

OTHER PUBLICATIONS

U.S. Appl. No. 15/693,122, titled "Wireless Devices and Systems Including Examples of Configuration Modes for Baseband Units and Remote Radio Heads", filed Aug. 31, 2017.

Luo, et al., Signal Processing for 5G: Algorithms and Implementations, IEEE—Wiley; Oct. 2016, 431-455.

U.S. Appl. No. 16/893,740, titled "Wireless Devices and Systems Including Examples of Configuration Modes for Baseband Units and Remote Radio Heads", dated Jun. 5, 2020, pp. all.

* cited by examiner

WIRELESS DEVICES AND SYSTEMS INCLUDING EXAMPLES OF CONFIGURATION MODES FOR BASEBAND UNITS AND REMOTE RADIO HEADS

CROSS REFERENCE TO RELATED APPLICATION(S)

This application is a continuation of U.S. patent application Ser. No. 15/447,699 filed Mar. 2, 2017 and issued as U.S. Pat. No. 10,070,432 on Sep. 4, 2018. The aforementioned application, and issued patent, is incorporated herein by reference, in its entirety, for any purpose.

BACKGROUND

Digital signal processing for wireless communications, such as digital baseband processing or digital front-end implementations, may be implemented using hardware (e.g. silicon) computing platforms. For example, multimedia processing and digital radio frequency (RF) processing may be accomplished by an application-specific integrated circuit (ASIC) which may implement a digital front-end for a wireless transceiver. A variety of hardware platforms are available to implement digital signal processing, such as the ASIC, a digital signal processor (DSP) implemented as part of a field-programmable gate array (FPGA), or a system-on-chip (SoC). However, each of these solutions often requires implementing customized signal processing methods that are hardware-implementation specific. For example, a digital signal processor may implement a specific portion of digital processing at a cellular base station, such as filtering interference based on the environmental parameters at that base station. Each portion of the overall signal processing performed may be implemented by different, specially-designed hardware, creating complexity.

Moreover, there is interest in moving wireless communications to "fifth generation" (5G) systems. 5G offers promise of increased speed and ubiquity, but methodologies for processing 5G wireless communications have not yet been set.

DETAILED DESCRIPTION

Figure 1:
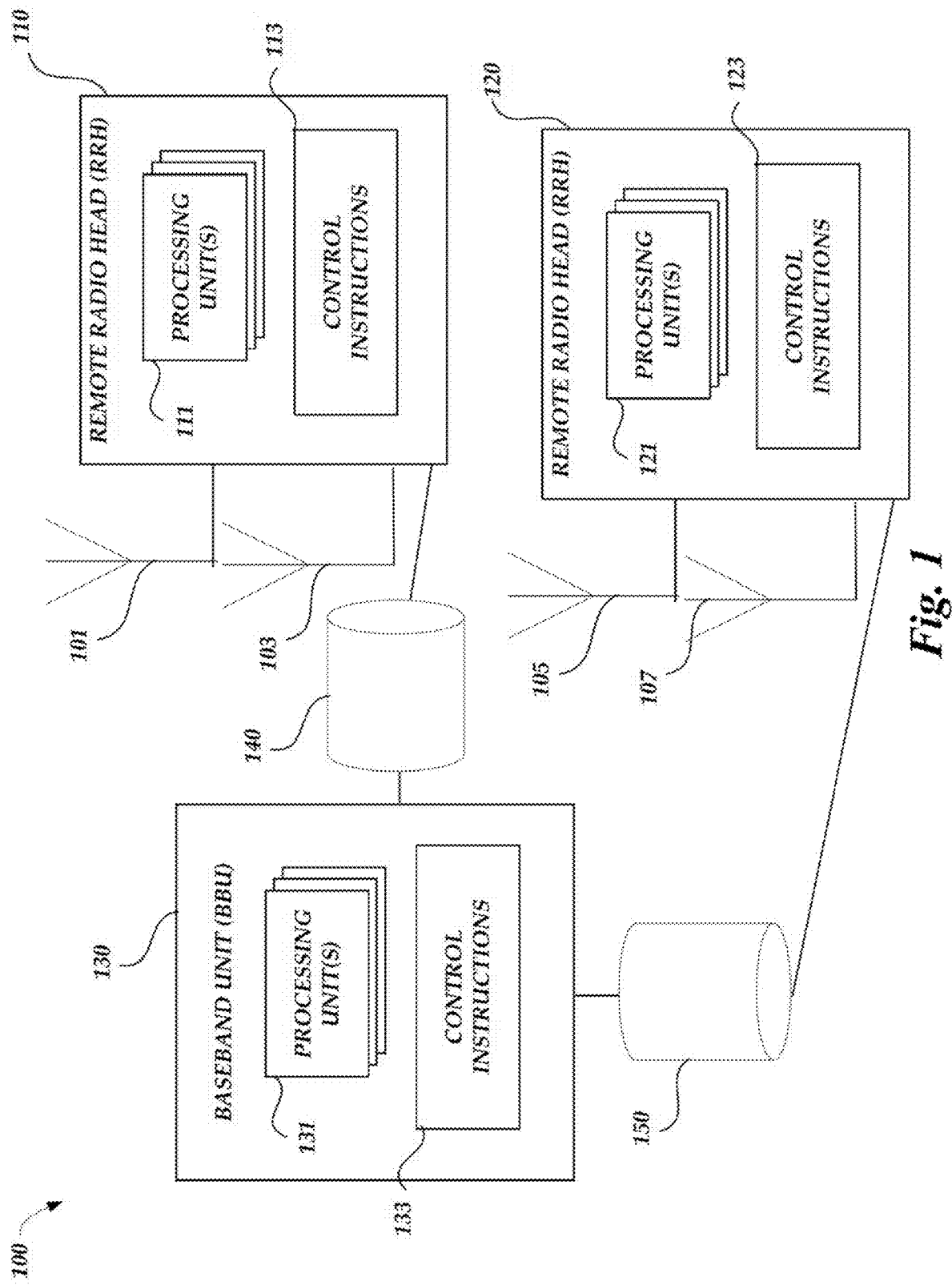
FIG. 1 is a schematic illustration of a computing system arranged in accordance with examples described herein.

Certain details are set forth below to provide a sufficient understanding of embodiments of the present disclosure. However, it will be clear to one skilled in the art that embodiments of the present disclosure may be practiced without various of these particular details. In some instances, well-known wireless communication components, circuits, control signals, timing protocols, computing system components, and software operations have not been shown in detail in order to avoid unnecessarily obscuring the described embodiments of the present disclosure.

There is interest in moving wireless communications to "fifth generation" (5G) systems. 5G offers promise of increased speed and ubiquity, but methodologies for processing 5G wireless communications have not yet been set. For example, some wireless processing stages may be implemented in an existing base station and other wireless processing may be implemented in a cloud computing network. The lead time in designing and manufacturing a hardware platform for wireless communications can be significant. Accordingly, it may be advantageous in some examples to design and/or process a hardware platform for 5G wireless communication that may process wireless communications, dynamically in either a cloud computing network or existing wireless structures (e.g., a wireless base station) using a reconfigurable architecture. In this manner the architecture utilized by a 5G wireless communication system may not need to be decided until after the platform is designed and/or fabricated.

Examples described herein include wireless devices and systems which may implement wireless processing stages using baseband units (BBUs) and remote radio heads (RRHs). In some examples, a BBU and one or more RRHs may form a cloud radio access network (C-RAN). A C-RAN may include base station functionality that is divided between RRHs and baseband units BBUs. An RRH may perform RF amplification, up/down conversion, filtering, ADC, or DAC to provide a baseband signal to a BBU. A BBU may process the baseband signals and optimize resource allocation among the RRHs. A fronthaul interface may be a link between an RRH and a BBU that may perform compression of the baseband signal to send the signal to the BBU and that may additionally perform estimation of the fronthaul link to compensate for any effects the fronthaul has on the baseband signal during transmission to the BBU. As described herein, reconfigurable hardware platforms may be utilized to implement a BBU and RRHs, together implementing a reconfigurable C-RAN. A reconfigurable hardware platform may allocate processing units to implement/perform wireless processing stages, such as wireless processing stages of a 5G wireless communication system. A hardware platform that can change the provision of instructions or a type of instructions to certain processing units, for example, while executing instructions on certain other processing units may be referred to as reconfigurable. A reconfigurable hardware platform, such as a reconfigurable fabric (e.g., an integrated circuit having the functionality of a reconfigurable hardware platform), may change types of instructions sent to certain processing units. Some processing units on the reconfigurable hardware platform may be executing or performing a certain functionality, such as adding or accumulating, and the processing units may be reconfigured to receive different instructions that can alter or change their respective functionalities. Accordingly, a processing unit that is executing instructions to add operands may be changed to a processing unit that is executing instructions to accumulate operands. Such a reconfigurable hardware platform can increase the rate of instruction execution and improve the efficiency of instruction set execution, such as providing instruction sets to certain processing units that are available. Such advantages related to rate of instruction execution or efficiency of instruction set execution may offer can lead to faster processing time of reconfigurable hardware platforms over a conventional ASIC or a specially-configured digital signal processing (DSP) unit.

A reconfigurable hardware platform may mix coefficient data with input data (e.g., a data stream to be transmitted) to implement a portion of the wireless processing stages to either generate an intermediate processing result or output data (e.g., an output data stream). The input data may be any data that is input for digital signal processing. The coefficient data may be any data that is specific to one or more wireless processing stages. For example, some wireless processing stages may be associated with specific wireless protocols. Examples of wireless protocols include, but are not limited to, a 5G wireless system utilizing a wireless protocol such as filter bank multi-carrier (FBMC), the generalized frequency division multiplexing (GFDM), universal filtered multi-carrier (UFMC) transmission, bi-orthogonal frequency division multiplexing (BFDM), orthogonal frequency-division multiple access (OFDMA), sparse code multiple access (SCMA), non-orthogonal multiple access (NOMA), multi-user shared access (MUSA) and faster-than-Nyquist (FTN) signaling with time-frequency packing. Generally, any wireless protocol including any 5G wireless protocol may be represented by coefficient data as disclosed herein. The input data may be mixed with the coefficient data to generate an intermediate processing result or output data. For example, a computing system including a reconfigurable architecture with processing units may mix the input data (e.g., a data stream to be transmitted) with coefficient data to generate an intermediate processing result that is representative of the transmission being processed according to the wireless protocol. In some examples, the computing system generates an approximation of the intermediate processing result. For example, the output data may be an approximation of the intermediate processing result generated when input data is processed in hardware (e.g., an FPGA) specifically-designed to implement the wireless protocol that the coefficients correspond to.

Advantageously in some examples, the systems and methods described herein may operate according to multiple standards and/or with multiple applications, including changes or upgrades to each thereto; in contrast to the inflexible framework of an ASIC-based solution. In some examples, as discussed herein in terms of processing units implementing multiplication, addition, or accumulation functionalities, examples of the systems and methods described herein may operate on a power-efficient framework, consuming minimal power with such functionalities; in contrast to a power-hungry framework of a FPGA/DSP-based solution. In some examples, systems and methods described herein may operate with a substantially integrated framework from a unified programming language perspective; in contrast to the various programming languages needed for integration of a SoC solution that may pose programming challenges when implementing heterogeneous interfaces for control units, computational units, data units and accelerator units.

Examples described herein include systems and methods which include BBUs and RRHs, implemented on respective reconfigurable fabrics. In some examples, the computing device may receive a configuration mode selection, for example, a configuration mode selection from a user interacting with the computing system. A processing mode selection can indicate specific configuration mode for the BBU and RRH. Control instructions may utilize a configuration mode selection to allocate respective processing units of the respective reconfigurable fabrics for processing of input data to generate output data.

In utilizing the configuration mode selection, wireless processing stages may be allocated as between the BBU and the RRH. For example, the configuration mode selection may indicate which wireless processing stages will be implemented on the BBU and which will be implemented on the RRH. The BBU(s) and RRH(s) may then accordingly reconfigure themselves to implement the appropriate stages without requiring changes to the BBU and/or RRH hardware. For example, a BBU may receive the input data and load instruction sets, based on the configuration mode, into respective processing units to perform some wireless processing stages at the BBU. In performing some wireless processing stages at the BBU, the BBU may generate an intermediate processing result based on mixing the input data with coefficient data specific to the wireless processing stages at the BBU. The intermediate processing result may correspond to the result of the wireless processing stages operating on the input data. In some examples, the RRH may receive the intermediate processing result and load additional instruction sets, based on the configuration mode, into respective processing units to perform additional wireless processing stages at RRH. In performing the additional wireless processing stages at the RRH, the RRH may generate a corresponding output data based on mixing the intermediate processing result with coefficient data specific to the additional wireless processing stages at the RRH. Generally, any wireless processing stage of a wireless protocol can be represented by coefficient data, which, in turn, may be utilized to mix input data or an intermediate processing result to generate, respectively, the intermediate processing result or the output data. Some wireless processing stages can include a Turbo coding processing stage, a modulation processing stage, a massive MIMO processing stage, and digital front-end processing stages. An RRH and a BBU may perform a subset of processing stages to generate an output data stream for a wireless transmission. In some cases, additional processing stages can be included at either the RRH or the BBU, and an order of the processing stages may change as specified in a configuration mode.

FIG. 1 is a schematic illustration of a computing system 100 arranged in accordance with examples described herein. The computing system 100 includes remote radio heads (RRHs) 110, 120, each coupled to baseband unit (BBU) 130 via a respective fronthaul link 140, 150. RRH 110, which may be implemented on a reconfigurable fabric, includes processing units 111 and control instructions 113. The control instructions 113 may be stored on non-transitory computer readable media, for example, as encoded executable instructions, which, when executed by the reconfigurable fabric, is configured to cause the apparatus RRH 110 to perform certain operations described herein. The RRH 110 is coupled to antennas 101, 103. The RRH 110 may be in communication with antennas 101, 103 to transmit or receive wireless communication signals, for example, modulated RF signals on a specific wireless band. RRH 120, which may also be implemented on a reconfigurable fabric, includes processing units 121 and control instructions 123. The RRH 120 is coupled to antennas 105, 107. The RRH 120 may be in communication with antennas 105, 107 to transmit or receive wireless communication signals, for example, modulated RF signals on a specific wireless band. RRH 120 may be transmitting or receiving on the same wireless band as RRH 110 or on a different wireless band. Control instructions 113, 123 may configure the respective RRHs 110, 120 for specific configuration modes. Control instructions 113 and 123 may be locally implemented on each respective RRH. In some examples, control instructions 113 and 123 may be the same control instructions implemented at a RRH 110 and communicated, as control signals, to RRH 120, or vice versa.

The BBU 130, which may be implemented on a reconfigurable fabric, includes processing units 131 and control instructions 133. The control instructions 133 may configure the BBU 130 for a specific configuration mode. The control instructions 113 may be stored on non-transitory computer readable media encoded with executable instructions which, when executed by the reconfigurable fabric, is configured to cause the BBU 130 to perform certain operations described herein. In some examples, control instructions 133 may be the same control instructions 113, 123 implemented at RRHs 110, 120, respectively. In such examples, the control instructions may be implemented at one entity (e.g., BBU 130 or RRH 110) and be communicated to the other entities as control signals that configure each entity for a specific configuration mode.

Each of the processing unit(s) 111, 121, 131 may be implemented using one or more operand processing units, such as an arithmetic logic unit (ALU), a bit manipulation unit, a multiplication unit, an accumulation unit, an adder unit, a look-up table unit, a memory look-up unit, or any combination thereof. In some examples, each of the processing unit(s) 111, 121, 131 may include circuitry, including custom circuitry, and/or firmware for performing functions described herein. For example, circuitry can include multiplication unit/accumulation units for performing the described functions, as described herein. Each of the processing unit(s) 111, 121, 131 can be implemented as a microprocessor or a digital signal processor (DSP), or any combination thereof. For example, processing unit(s) 111, 121, 131 can include levels of caching, such as a level one cache and a level two cache, a core, and registers. An example processor unit can include. Examples of processing unit(s) 11, 121, 131 are described herein, for example with reference to FIG. 2.

Fronthaul link 140 may communicate information between RRH 110 and BBU 130. BBU 130 may compress information (e.g., via a compression algorithm) to be transmitted over the fronthaul link 140 at a specific bandwidth supported by the fronthaul link 140. RRH 110 may also compress information to be transmitted over the fronthaul link 140. Execution of the control instructions 133 or control instructions 113 may determine a threshold amount of information to transmit to/from the BBU 130 or RRH 110 based on a processing time of the BBU, a processing time of the RRH, and a transmission time over the fronthaul link 140. Execution of the control instructions 133 or control instructions 113 may compare a summation time of the processing time of the RRH and transmission time over the fronthaul link 140 to the processing time of the BBU. If the processing time of the BBU is less than the summation time of the processing time of the RRH and transmission time over the fronthaul link 140, then, during execution of the control instructions 133 or control instructions 113, a determination may be made that at least one of wireless processing stages included in the RRH 110 may be processed at the BBU 130, which may achieve an overall lower processing time for the system 100. In such a case, as described herein, execution of the control instructions 133 or control instructions 113 may allocate some of the processing units 131 to perform the at least one wireless processing stage determined to be of less overall processing time at the BBU 130. In some examples, an external user or computing system may compare the processing times and generate a configuration mode selection based on the comparison of processing times. The configuration mode selection may specify whether the RRH 110 or the BBU 130 is to perform certain wireless processing stages of a wireless protocol, as described herein with reference to FIG. 3. A computer readable-media executing the control instructions 133 or control instructions 113 may continuously evaluate processing times at the BBU 130 and the RRH 110 to determine whether an overall processing time may be reduced by allocating different wireless processing stages to either the BBU 130 or the RRH, for example, by configuring the BBU 130 or the RRH 110 for a specific configuration mode.

Fronthaul link 150 may communicate information between RRH 120 and BBU 130. BBU 130 may compress information (e.g., via a compression algorithm) to be transmitted over the fronthaul link 150 at a specific bandwidth supported by the fronthaul link 150. RRH 120 may also compress information to be transmitted over the fronthaul link 150. Execution of the control instructions 133 or control instructions 123 may include a determination of a processing time threshold to transmit to/from the BBU 130 or RRH 120 the compressed information based on a processing time of the BBU, a processing time of the RRH, and a transmission time over the fronthaul link 150. Execution of the control instructions 133 or control instructions 123 may include a comparison of a summation time of the processing time of the RRH and transmission time over the fronthaul link 150 to the processing time of the BBU. The summation time of the processing time of the RRH and transmission time over the fronthaul link 150 may define the processing time threshold, such that if the processing time threshold is passed, execution of the control instructions 133 or control instructions 123 may include an alteration of the configuration mode. If the processing time of the BBU is less than the summation time of the processing time of the RRH and transmission time over the fronthaul link 150, then the execution of the control instructions 133 or control instructions 123 may include a determination that at least one of wireless processing stages included in the RRH 120 may be processed at the BBU 130, which may achieve an overall lower processing time for the system 100. In such a case, as described herein, execution of the control instructions 133 or control instructions 123 may include an allocation of some of the processing units 131 to perform the at least one wireless processing stage determined to be of less overall processing time at the BBU 130.

In some examples, an external user or computing system may compare the processing times and generate a configuration mode selection according to the comparison of processing times. The configuration mode selection may specify whether the RRH 120 or the BBU 130 is to perform certain wireless processing stages of a wireless protocol, as described herein with reference to FIG. 3. A computer readable-media executing the control instructions 133 or control instructions 123 may continuously evaluate processing times at the BBU 130 and the RRH 120 to determine whether an overall processing time may be reduced by allocating different wireless processing stages to either the BBU 130 or the RRH, for example, by configuring the BBU 130 or the RRH 120 for a specific configuration mode.

As described above, the BBU 130 may operate in a configuration mode for the RRH 110 and a configuration mode for the 120. In some examples, the configuration mode for the BBU may be the same for each respective RRH 110, 120; in which case, the BBU 130 may multiplex the reception and transmission of information to each RRH 110, 120. In some examples, the BBU 130 may operate in a first configuration mode for the RRH 110 and a second configuration mode for the RRH 120. In such a case, the BBU may allocate processing unit(s) 131 for each RRH 110, 120, such that the overall processing time of the computing system 100 is reduced among the processing times of the BBU 130, the RRH 110, the RRH 120 and the transmission times of the fronthaul links 140, 150.

The entities of the computing system 100 described herein, such as the RRH 110, the RRH 120, and/or the BBU 130 shown in FIG. 1, may be implemented using generally any electronic device for which communication capability is desired. For example, the BBU 130 may be implemented using a server or a combination of servers. The RRH 110, 120 may be implemented using a mobile phone, smartwatch, computer (e.g. a server, laptop, tablet, desktop), or radio. In some examples, the RRH 110 and/or the RRH 120 may be incorporated into and/or in communication with other apparatuses for which communication capability is desired, such as but not limited to, a wearable device, a medical device, an automobile, airplane, helicopter, appliance, tag, camera, or other device. In various embodiments, the RRH 110 or the RRH 120 may be a wireless base station, such as those installed in cellular wireless communication networks.

While not explicitly shown in FIG. 1, the RRH 110, the RRH 120, and/or the BBU 130 may include any of a variety of components in some examples, including, but not limited to, memory, input/output devices, circuitry, processing units (e.g. processing elements and/or processors), or combinations thereof.

The RRH 110 and the RRH 120 may each include multiple antennas. For example, the RRH 110 and the RRH 120 may each have more than two antennas. Two antennas each are shown in FIG. 1, but generally any number of antennas may be used including 2, 3, 4, 5, 6, 7, 8, 9, 10, 11, 12, 13, 14, 15, 16, 32, or 64 antennas. Other numbers of antennas may be used in other examples. In some examples, the RRH 110 and the RRH 120 may have an identical number of antennas, as shown in FIG. 1. In other examples, the RRH 110 and the RRH 120 may have different numbers of antennas. Generally, systems described herein may include multiple-input, multiple-output ("MIMO") systems. MIMO systems generally refer to systems including one or more RRHs which transmit transmissions using multiple antennas and one or more RRHs which receive transmissions using multiple antennas. In some examples, RRHs may both transmit and receive transmissions using multiple antennas. As the number of antennas increase, so to generally does the complexity involved in accurately transmitting and/or receiving transmissions.

Although two RRHs (e.g. RRH 110 and RRH 120) are shown in FIG. 1, generally the system 100 may include any number of RRHs. In addition, while a single BBU 130 is shown in FIG. 1, generally the system 100 may include any number of BBUs coupled to respective RRHs. In some cases, an RRH of the system 100 may be coupled to one or more BBUs.

Figure 2:
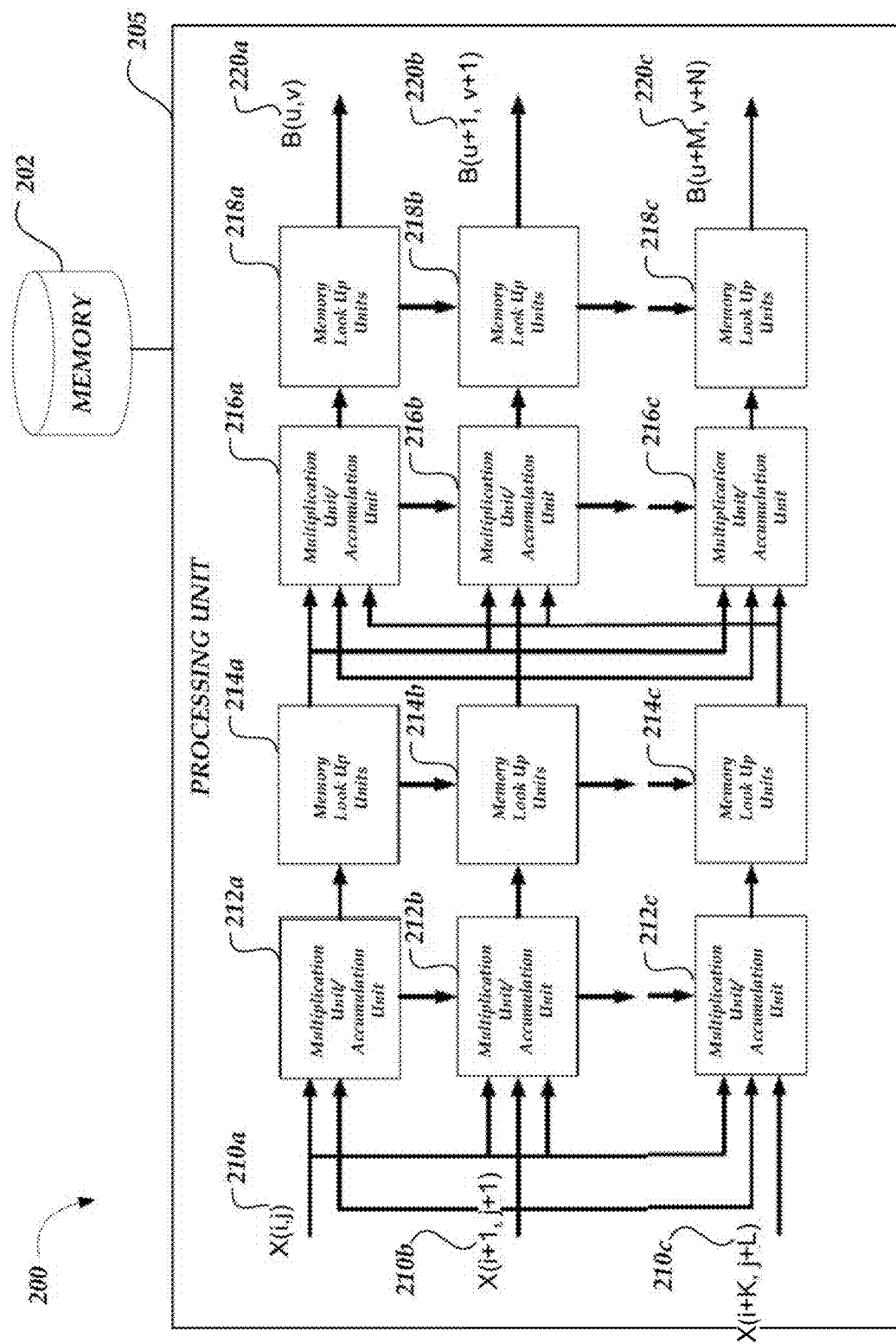
FIG. 2 is a schematic illustration of a computing system arranged in accordance with the example of FIG. 1.

FIG. 2 is a schematic illustration of a processing unit 205 arranged in a system 200 in accordance with examples described herein. The system 200 may be the RRH 110, the RRH 120, or the BBU 130, for example. The processing unit 205 may receive input data (e.g. X (i,j)) 210a-c from such a computing system. In some examples, the input data 210a-c may be input data, such as data to be transmitted in a wireless system, or an intermediate processing result. In some examples, the processing unit 205 may implement a specific configuration mode for a respective entity of the system 100. For example, the BBU 130 may process data to be transmitted at one or more processing unit(s) 131, each implemented as processing unit 205; and the RRH 110 may process an intermediate processing result at one or more processing unit(s) 111, each implemented as processing unit 205. The processing unit 205 may include multiplication unit/accumulation units 212a-c, 216a-c and memory look-up units 214a-c, 218a-c that, when mixed with coefficient data retrieved from the memory 202, may generate output data (e.g. B (u,v)) 220a-c. In some examples, the output data 220a-c may be an intermediate processing result or an output wireless data stream of a computing system, where the output data stream is to be transmitted via an antenna.

The multiplication unit/accumulation units 212a-c, 216a-c multiply two operands from the input data 210a-c to generate a multiplication processing result that is accumulated by the accumulation unit portion of the multiplication unit/accumulation units 212a-c, 216a-c. The multiplication unit/accumulation units 212a-c, 216a-c adds the multiplication processing result to update the processing result stored in the accumulation unit portion, thereby accumulating the multiplication processing result. For example, the multiplication unit/accumulation units 212a-c, 216a c may perform a multiply-accumulate operation such that two operands, M and N, are multiplied and then added with P to generate a new version of P that is stored in its respective multiplication unit/accumulation units. The memory look-up units 214a-c, 218a-c retrieve coefficient data stored in memory 202. For example, the memory look-up unit can be a table look-up that retrieves a specific coefficient. The output of the memory look-up units 214a-c, 218a-c is provided to the multiplication unit/accumulation units 212a-c, 216a c that may be utilized as a multiplication operand in the multiplication unit portion of the multiplication unit/accumulation units 212a-c, 216a-c. Using such a circuitry arrangement, the output data (e.g. B (u,v)) 220a-c may be generated from the input data (e.g. X (i,j)) 210a-c.

In some examples, coefficient data, for example from memory 202, can be mixed with the input data X (i,j) 210a-c to generate the output data B (u,v) 220a-c. The relationship of the coefficient data to the output data B (u,v) 220a-c based on the input data X (i,j) 210a-c may be expressed as:

$$B(u,v) = f\left(\sum_{m,n}^{M,N} a''_{m,n} f\left(\sum_{k,j}^{K,L} a'_{k,l} X(i+k, j+l)\right)\right) \quad (1)$$

where $a_{k,l}'$, $a_{m,n}''$, are coefficients for the first set of multiplication/accumulation units 212a-c and second set of multiplication/accumulation units 216a-c, respectively, and where f(●) stands for the mapping relationship performed by the memory look-up units 214a-c, 218a-c. As described above, the memory look-up units 214a-c, 218a c retrieve coefficients to mix with the input data. Accordingly, the output data may be provided by manipulating the input data with multiplication/accumulation units using a set of coefficients stored in the memory associated with a desired wireless protocol. The resulting mapped data may be manipulated by additional multiplication/accumulation units using additional sets of coefficients stored in the memory associated with the desired wireless protocol. The sets of coefficients multiplied at each stage of the processing unit 205 may represent or provide an estimation of the processing of the input data according to a wireless protocol in specifically-designed hardware (e.g., an FPGA). Further, it can be shown that the system 200, as represented by Equation 1, may approximate any nonlinear mapping with arbitrarily small error in some examples and the mapping of system 200 is determined by the coefficients $a_{k,l}'$, $a_{m,n}''$. For example, if such coefficient data is specified, any mapping and processing between the input data X (i,j) 210a-c and the output data B (u,v) 220a-c may be accomplished by the system 200. Such a relationship, as derived from the circuitry arrangement depicted in system 200, may be used to train an entity of the computing system 100 (e.g., the RRH 110 or the BBU 130) to generate coefficient data. For example, using Equation (1), an entity of the computing system 100 may compare input data to the output data to generate the coefficient data.

In the example of system 200, the processing unit 205 mixes the coefficient data with the input data X (i,j) 210a-c utilizing the memory look-up units 214a-c, 218a-c. In some examples, the memory look-up units 214a-c, 218a-c can be referred to as table look-up units. The coefficient data may be associated with a mapping relationship for the input data X (i,j) 210a-c to the output data B (u,v) 220a-c. For example, the coefficient data may represent non-linear mappings of the input data X (i,j) 210a-c to the output data B (u,v) 220a-c. In some examples, the non-linear mappings of the coefficient data may represent a Gaussian function, a piece-wise linear function, a sigmoid function, a thin-plate-spline function, a multi-quadratic function, a cubic approximation, an inverse multi-quadratic function, or combinations thereof. In some examples, some or all of the memory look-up units 214a-c, 218a-c may be deactivated. For example, one or more of the memory look-up units 214a-c, 218a-c may operate as a gain unit with the unity gain. In such a case, the instructions 117 may be executed to facilitate selection of a unity gain processing mode for some or all of the memory look up units 214a-c, 218a-c.

Each of the multiplication unit/accumulation units 212a-c, 216a-c may include multiple multipliers, multiple accumulation unit, or and/or multiple adders. Any one of the multiplication unit/accumulation units 212a-c, 216a may be implemented using an ALU. In some examples, any one of the multiplication unit/accumulation units 212a-c, 216a-c can include one multiplier and one adder that each perform, respectively, multiple multiplications and multiple additions. The input-output relationship of a multiplication/accumulation unit 212, 216 may be represented as:

$$B_{out} = \sum_{i=1}^{I} C_i * B_{in}(i) \qquad (2)$$

where "I" represents a number to perform the multiplications in that unit, $C_i$ the coefficients which may be accessed from a memory, such as memory 202, and $B_{in}(i)$ represents a factor from either the input data X (i,j) 210a-c or an output from multiplication unit/accumulation units 212a-c, 216a-c. In an example, the output of a set of multiplication unit/accumulation units, $B_{out}$, equals the sum of coefficient data, $C_i$ multiplied by the output of another set of multiplication unit/accumulation units, $B_{in}(i)$. $B_{in}(i)$ may also be the input data such that the output of a set of multiplication unit/accumulation units, $B_{out}$, equals the sum of coefficient data, $C_i$ multiplied by input data.

Figure 3:
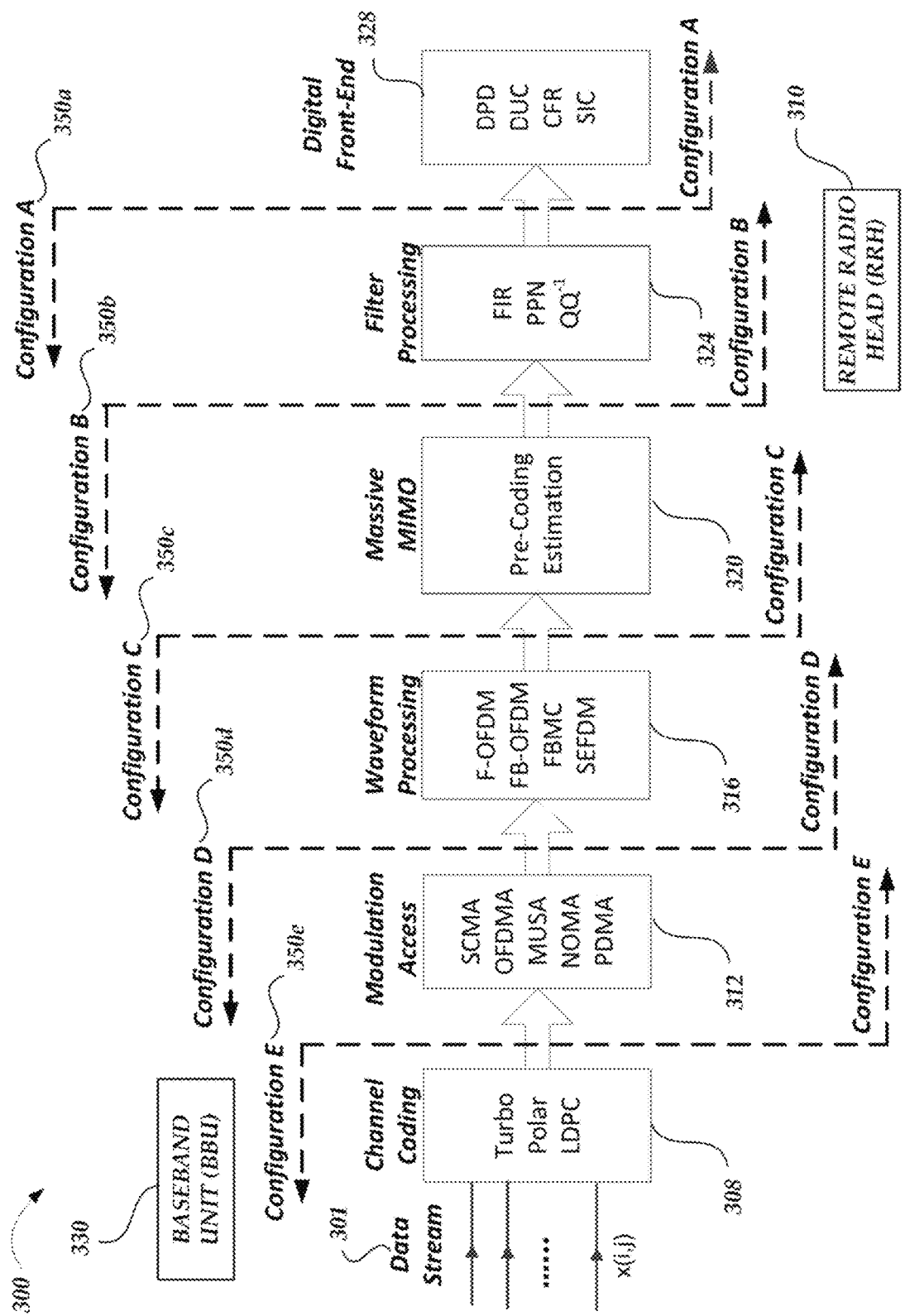
FIG. 3 is a schematic illustration of a computing system arranged in accordance with examples described herein.

FIG. 3 is a schematic illustration of a computing system 300 arranged in accordance with examples described herein. The computing system 300 includes a BBU 330 and a RRH 310. While not depicted as coupled in FIG. 3, the BBU 330 and the RRH 310 may be coupled via a fronthaul link, in an analogous manner to how the BBU 130 and the RRH 110 are coupled via the fronthaul link 140 in FIG. 1. The computing system 300 may be configured to implement various configuration modes 350a-350e, with each configuration mode allocating a wireless processing stage to either the BBU 330 or the RRH 310, as indicated by the directional dotted arrows pointing towards either the BBU 330 or the RRH 310. The computing system 300 receives input data x (i,j) 301 and performs wireless processing stages on the input data. The BBU 330 and the RRH 310 operate in conjunction upon the input data x (i,j) 301 to perform various wireless processing stages, with the operation of the wireless processing stage dependent on the configuration mode 350a-e.

The wireless processing stages of FIG. 3 include channel coding 308, modulation access 312, waveform processing 316, massive MIMO 320, filter processing 324, and digital front-end 328. Chanel coding 308 may include Turbo coding, polar coding, or low-density parity-check (LDPC) coding. It can be appreciated that channel coding 308 can include various types of channel coding. Modulation access 312 may include sparse code multiple access (SCMA), orthogonal frequency division multiple access (OFDMA), multi-user shared access (MUSA), non-orthogonal multiple access (NOMA), and/or polarization division multiple access (PDMA). Waveform processing 316 may include Filtered-Orthogonal Frequency Division Multiplexing (F-OFDM), Filter-Bank Frequency Division Multiplexing (FB-OFDM), Spectrally Efficient Frequency Division Multiplexing (SEFDM), and/or Filter Bank Multicarrier (FBMC). It can be appreciated that modulation access 312 can include various types of modulation access. The Massive MIMO 320 may include pre-coding estimation and various other functionalities associated with Massive MIMO. Filter processing 324 may include various types of digital filters, such as a finite impulse response (FIR) filter, a poly-phase network (PPN) filter, and/or $QQ^{-1}$ filter, which may refer to a filter that adjusts for compression and decompression of data. The digital front-end 328 may include baseband processing of a wireless transmitter or a wireless receiver. Such a digital front-end may include various functionalities for operating as a digital front-end transmitter or receiver, such as: an analog-to-digital conversion (ADC) processing, digital-to-analog (DAC) conversion processing, digital up conversion (DUC), digital down conversion (DDC), direct digital synthesizer (DDS) processing, DDC with DC offset compensation, digital pre-distortion (DPD), peak-to-average power ratio (PAPR) determinations, crest factor reduction (CFR) determinations, pulse-shaping, image rejection, delay/gain/imbalance compensation, noise-shaping, numerical controlled oscillator (NCO), and/or self-interference cancellation (SIC).

It can be appreciated that the RRH 310 may operate as a wireless transmitter or a wireless receiver (or both as multiplexing wireless transceiver). While depicted in FIG. 3 with the RRH 310 operating as a wireless transmitter (by receiving a processed input data stream x (i,j) 301 from the BBU 330), it can be appreciated that the RRH 310 may operate as a wireless receiver that receives a transmitted wireless signal and processes that signal, according to wireless processing stages allocated to the RRH 310. The data flow may flow the opposite way to the depiction of FIG. 3, with the functionalities of the various wireless processing stages inverted. For example, in a configuration mode E 350e, the BBU 330 may receive an intermediate processing result from the RRH 310 and decode that intermediate processing result at the wireless processing stage associated with channel coding 308.

Upon determination of a configuration mode or upon receiving a configuration mode selection, the computing system 300 may allocate the wireless processing stages 308, 312, 316, 320, 324, and 328 to either the BBU 330 or the RRH 310. The configuration mode A 350a configures the RRH 310 to perform the one wireless processing stage, the digital front-end 328. In configuration mode A 350a, the other wireless processing stages, channel coding 308, modulation access 312, waveform processing 316, massive MIMO 320, and filter processing 324, are performed by the BBU 330. The computing system 300 may receive an additional configuration mode selection or determine a different configuration mode, based at least on processing times of the BBU 330 and the RRH 310. When a different configuration mode is specified, the BBU 330 and the RRH 310 may allocate processing unit(s) of each accordingly to accommodate the different configuration mode. Each configuration mode 350a-350e may be associated with a different set of coefficients for both the BBU 330 and the RRH 310 that is to be mixed with either the input data x (i,j) 301 or an intermediate processing result. Coefficients may be also associated with specific wireless protocols, such as 5G wireless protocols, such that the BBU 330 and the RRH 310 may be processing according to different wireless protocols. The intermediate processing results may be any processing result received by the other entity (e.g., the RRH 310 or the BBU 330), upon completion of processing by the initial entity (e.g., the BBU 330 or the RRH 310, respectively). As depicted in FIG. 3, various configuration modes 350a-350e are possible.

Figure 4A:
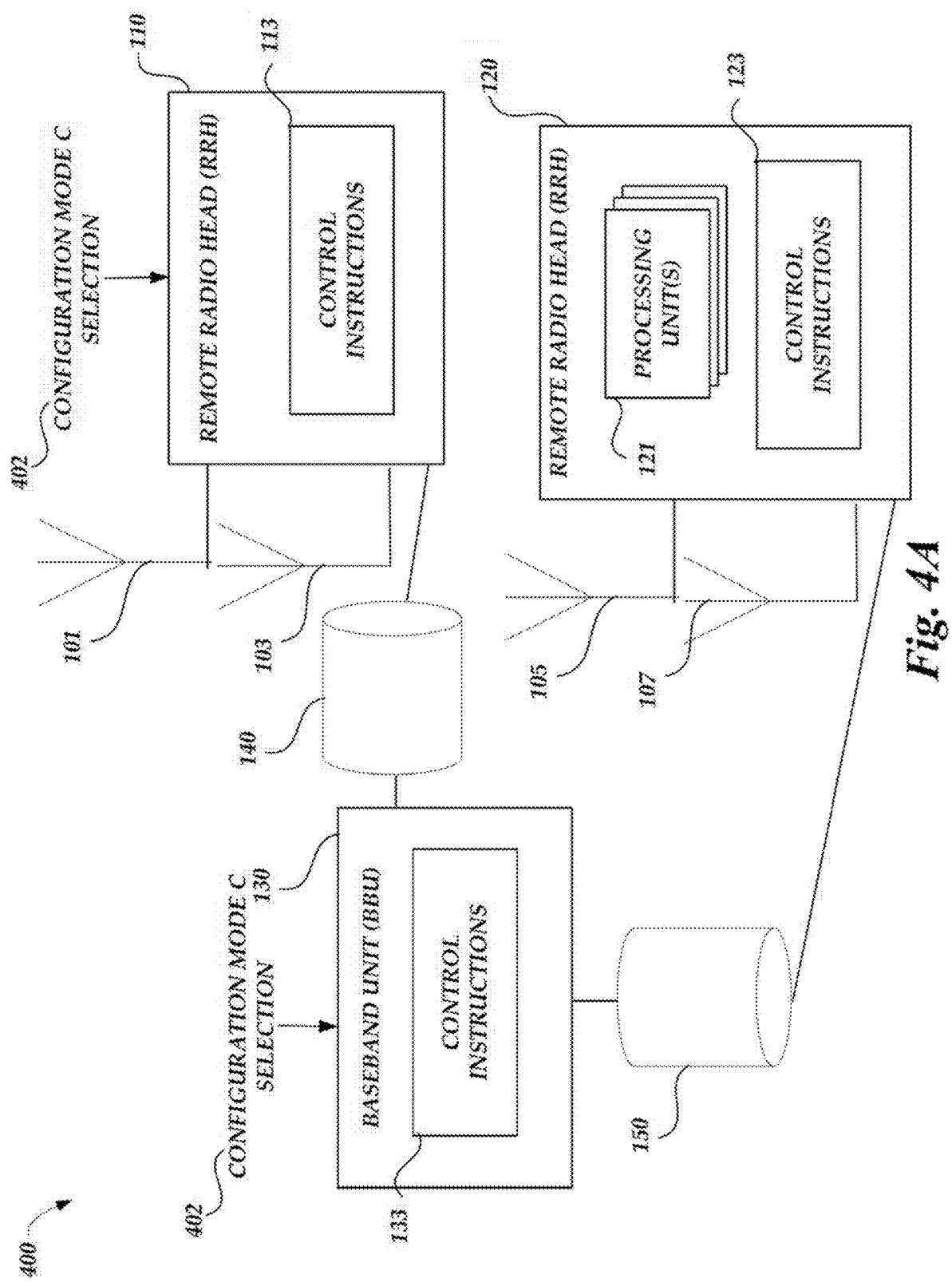
FIG. 4A-4D are schematic illustrations of a computing system arranged in accordance with examples described herein.

FIGS. 4A-4D are schematic illustrations of a computing system 400 arranged in accordance with some of the configuration modes described in FIG. 3. With reference to FIG. 4A, the computing system 400 may receive a configuration mode C selection 402 from an external user or computing system. A configuration mode C selection 402 may specify that the configuration mode C 350c is to be configured for the BBU 130 and the RRH 110. The RRH 120 may not receive the configuration mode C selection 402 and may operate according to a different configuration mode with the BBU 130. Upon receiving the configuration mode C selection 402 at the BBU 130, execution of the control instructions 133 may include configuration of the BBU 130 to operate with the wireless processing stages associated with the configuration mode C 350c. In some examples, execution of the control instructions 133 may include allocation of the one or more processing unit(s) 131 (not depicted) of a reconfigurable fabric in the BBU 130 to operate according to the configuration mode C 350c. Execution of the control instructions 133 may include loading instruction sets into the allocated one or more processing unit(s) 131 that specify mixing input data (e.g., an input data stream) with coefficient data associated with the configuration mode C 350c for the BBU 130. The one or more processing unit(s) 131, implemented as processing unit 205, may retrieve, from a memory of the BBU 130 or an external memory, the coefficient data associated with the configuration mode C 350c for the BBU 130. Execution of the control instructions 113 may include allocation of the one or more processing unit(s) 111 (not depicted) of a reconfigurable fabric in the RRH 110 to operate according to the configuration mode C 350c. Execution of the control instructions 113 may include loading instruction sets into the allocated one or more processing unit(s) 111 that specify mixing input data (e.g., an intermediate processing result) with coefficient data associated with the configuration mode C 350c for the RRH 110. In some examples, the one or more processing unit(s) 111, implemented as processing unit 205, may retrieve, from a memory of the RRH 110 or an external memory, the coefficient data associated with the configuration mode C 350c for the RRH 110.

Figure 4B:
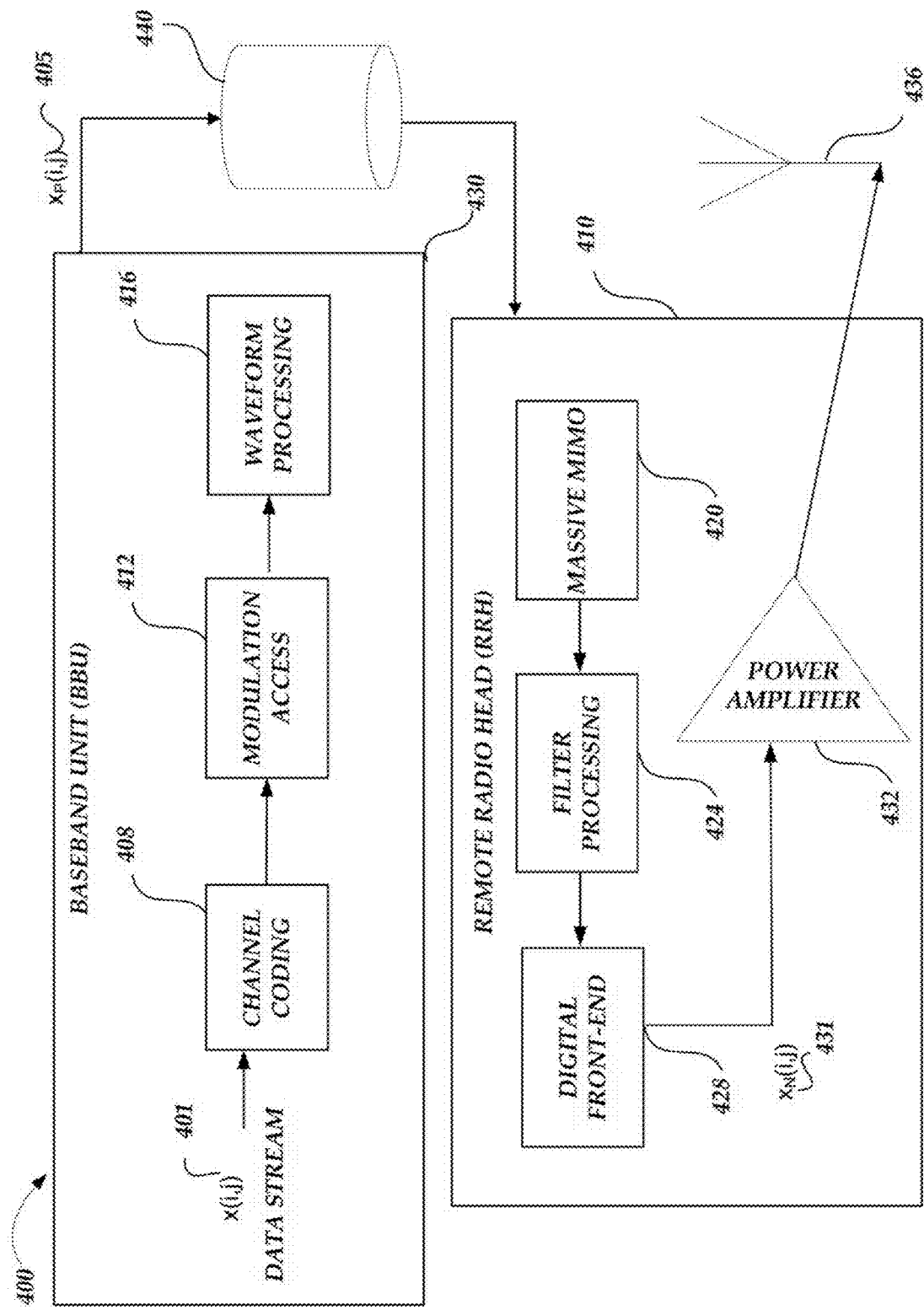

FIG. 4B depicts a BBU 430 and an RRH 410 configured according to a configuration mode C 350c. For example, the BBU 430 and the RRH 410 may be configured according to the configuration mode C 350c; upon receiving a configuration mode C selection 402 or upon a determination that an overall processing time of the computing system 400 may be optimized based on the processing time of the BBU 430 in configuration mode C, the transmission time of the fronthaul link 440, and the processing time of the RRH 410. For example, in the latter case of optimization, a processing time threshold may be compared to either of the processing times of the BBU 430 or the RRH 410. Based on the comparison, the execution of the control instructions 133 or control instructions 113 may include altering the configuration mode of the BBU 430 and the RRH 410 to the configuration mode C 350c. As depicted, the configuration mode C 350c specifies that certain wireless processing stages are allocated to the BBU 430 and other wireless processing stages are allocated to the RRH 410. The BBU 430 includes the wireless processing stages of channel coding 408, modulation access 412, and the waveform processing 416. The RRH 410 includes the wireless processing stages of massive MIMO 420, filter processing 424, and digital front-end 428. The RRH 410 may also include a power amplifier 432 that is coupled to an antenna 436 for transmission of a wireless communication signal.

The BBU 430 may receive an input data stream x(i,j) 401 that is processed in the wireless processing stages of channel coding 408, modulation access 412, and the waveform processing 416 to generate an intermediate processing result $x_P(i,j)$ 405. The intermediate processing result $x_P(i,j)$ 405 may be compressed according to a compression algorithm for transmission over the fronthaul link 440. The RRH 410 may receive and decompress the intermediate processing result $x_P(i,j)$ 405 for further processing at the wireless processing stages allocated in the RRH 410. In configuration mode C 350c, the wireless processing stages at the RRH. 410 are the massive MIMO 420, filter processing 424, and the digital front-end 428. The RRH 410 may process the intermediate processing result $x_P(i,j)$ 405 to generate an output data stream $x_N(i,j)$ 430. The output data stream $x_N(i,j)$ 430 may be amplified by the power amplifier 432 and transmitted as a wireless communication signal via antenna 436.

Figure 4C:
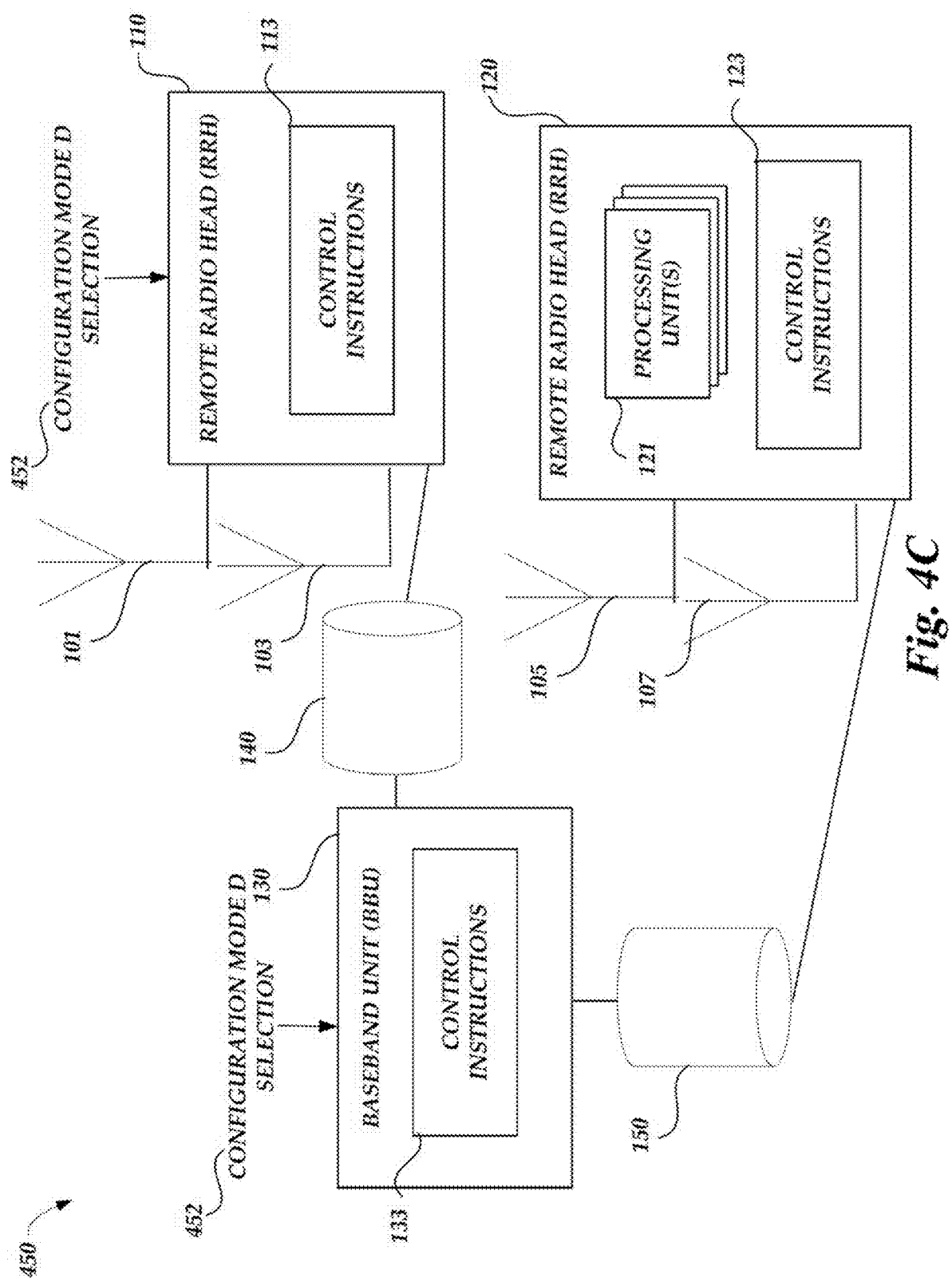
Figure 4D:
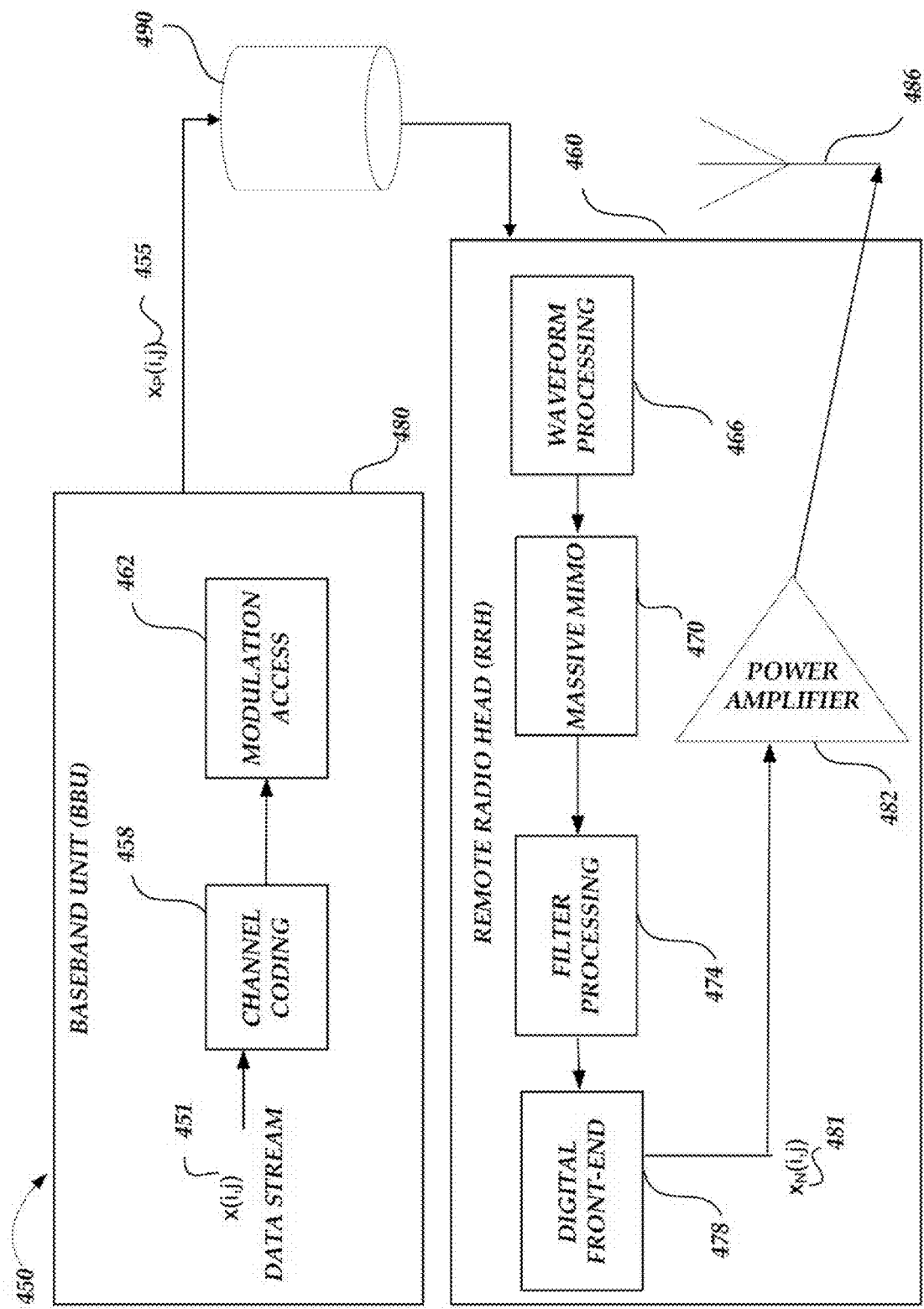

With reference to FIG. 4C, the computing system 450 may receive a configuration mode B selection 452 from an external user or computing system. A configuration mode B selection 452 may specify that the configuration mode B 350b is to be configured for the BBU 130 and the RRH 110. The RRH 120 may not receive the configuration mode B selection 452 and may operate according to a different configuration mode with the BBU 130. Upon receiving the configuration mode B selection 452 at the BBU 130, execution of the control instructions 133 may include configuring the BBU 130 to operate with the wireless processing stages associated with the configuration mode B 350b. Execution of the control instructions 133 may include allocating one or more processing unit(s) 131 (not depicted) of a reconfigurable fabric in the BBU 130 to operate according to the configuration mode B 350b. Execution of the control instructions 133 may include loading instruction sets into the allocated one or more processing unit(s) 131 that specify mixing input data (e.g., an input data stream) with coefficient data associated with the configuration mode B 350*b* for the BBU 130. The one or more processing unit(s) 131, implemented as processing unit 205, may retrieve, from a memory of the BBU 130 or an external memory, the coefficient data associated with the configuration mode B 350*b* for the BBU 130. Execution of the control instructions 113 may include allocating one or more processing unit(s) 111 (not depicted) of a reconfigurable fabric in the RRH 110 to operate according to the configuration mode B 350*b*. Execution of the control instructions 113 may include loading instruction sets into the allocated one or more processing unit(s) 111 that specify mixing input data (e.g., an intermediate processing result) with coefficient data associated with the configuration mode B 350*b* for the RRH 110. The one or more processing unit(s) 111, implemented as processing unit 205, may retrieve, from a memory of the RRH 110 or an external memory, the coefficient data associated with the configuration mode B 350*b* for the RRH 110.

FIG. 4B depicts a BBU 480 and an RRH 460 configured according to a configuration mode B 350*b*. For example, the BBU 480 and the RRH 460 may be configured according to the configuration mode B 350*b*, upon receiving a configuration mode B selection 452 or upon a determination that an overall processing time of the computing system 400 may be optimized based on the processing time of the BBU 480 in configuration mode C, the transmission time of the fronthaul link 490, and the processing time of the RRH 460. For example, in the latter case of optimization, a processing time threshold may be compared to either of the processing times of the BBU 480 or the RRH 460. Based on the comparison, execution of the control instructions 133 or control instructions 113 may include altering the configuration mode of the BBU 480 and the RRH 460 to the configuration mode B 350*b*. As depicted, the configuration mode B 350*b* specifies that certain wireless processing stages are allocated to the BBU 480 and other wireless processing stages are allocated to the RRH 460. The BBU 480 includes the wireless processing stages of channel coding 458 and modulation access 462. The RRH 460 includes the wireless processing stages of waveform processing 456, massive MIMO 470, filter processing 474, and digital front-end 478. The RRH 460 may also include a power amplifier 482 that is coupled to an antenna 486 for transmission of a wireless communication signal.

The BBU 480 may receive an input data stream x(i,j) 451 that is processed in the wireless processing stages of channel coding 458 and modulation access 462 to generate an intermediate processing result $x_P(i,j)$ 455. The intermediate processing result $x_P(i,j)$ 455 may be compressed according to a compression algorithm for transmission over the fronthaul link 490. The RRH 460 may receive and decompress the intermediate processing result $x_P(i,j)$ 455 for further processing at the wireless processing stages allocated in the RRH 460. In configuration mode B 350*b*, the wireless processing stages at the RRH 460 are the waveform processing 466, massive MIMO 470, filter processing 474, and the digital front-end 478. The RRH 460 may process the intermediate processing result x(i,j) 455 to generate an output data stream $x_N(i,j)$ 480. The output data stream $x_N(i,j)$ 480 may be amplified by the power amplifier 482 and transmitted as a wireless communication signal via antenna 486.

Figure 5:
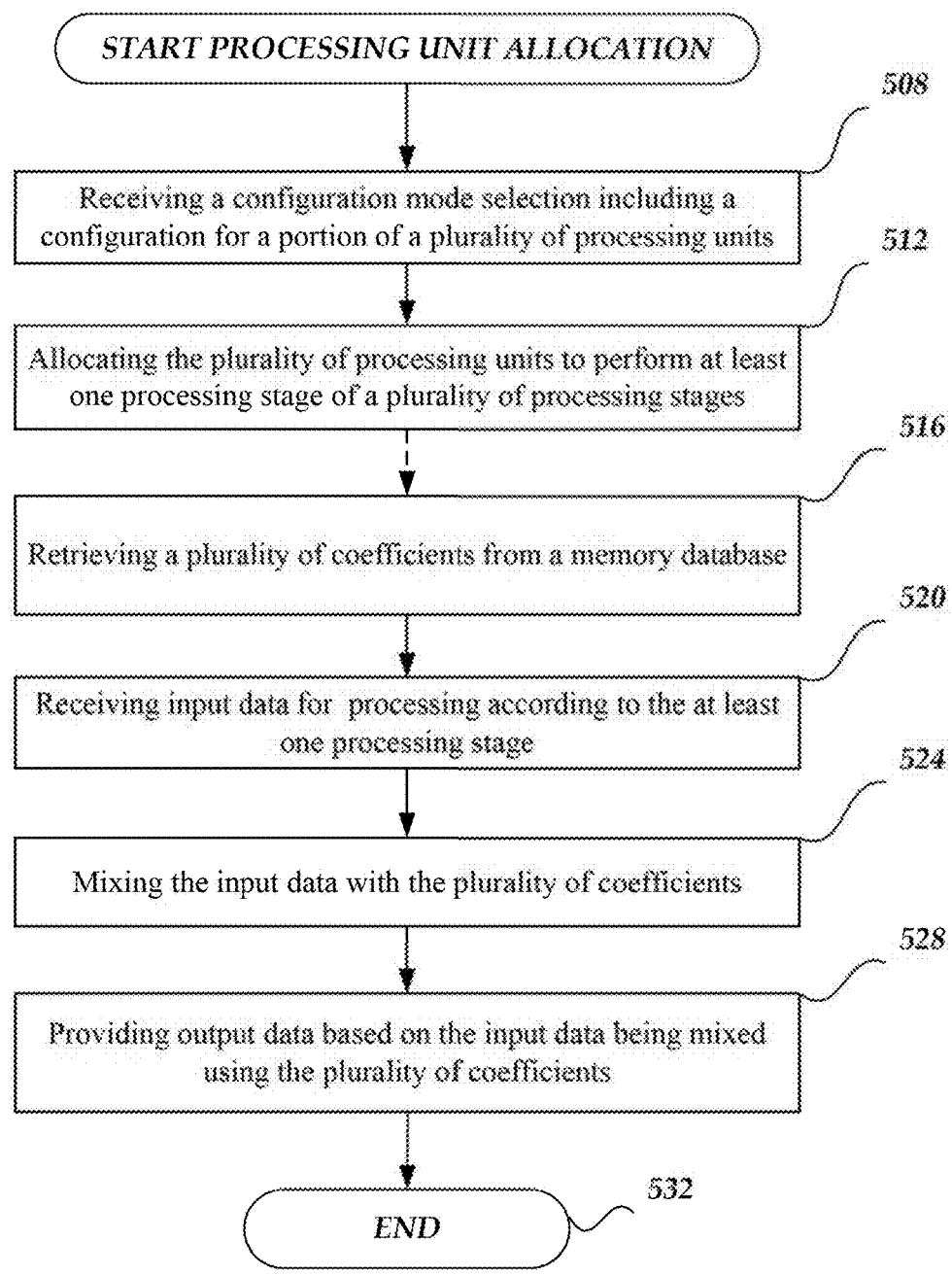
FIG. 5 is a flowchart of a method arranged in accordance with examples described herein.

FIG. 5 is a flowchart of a method 500 in accordance with examples described herein. Example method 500 may be implemented using, for example, computing system 100 in FIG. 1, computing system 300 in FIG. 3, or any system or combination of the systems depicted in FIGS. 1-4D described herein. In some examples, the blocks in example method 500 may be performed by a computing system such as a computing system 400 of FIG. 4 implementing processing units in the reconfigurable fabrics therein as a processing unit 205 of FIG. 2. The operations described in blocks 508-532 may also be stored as control instructions in a computer-readable medium at a BBU or an RRH.

Example method 500 may begin the processing allocation method. The method 500 may include a block 508 that recites "receiving a configuration mode selection including a configuration for a portion of a plurality of processing units." The configuration mode selection may be received as a selection from a touchscreen of an external computing device that communicates with a computing system, such as computing system 100. Configuration mode selections may be received by any BBU or RRH configured to receive such selections and which may be configured to allocate respective processing units of a respective reconfigurable fabric according to the configuration mode. Block 508 may be followed by block 512 that recites "allocating the plurality of processing units to perform at least one processing stage of a plurality of processing stages." As described herein, allocating processing units may include loading certain processing units of an RRH and/or a BBU with instructions sets that execute certain wireless processing stages associated with a wireless protocol. For example, a computing system may operate in a specific configuration mode that partitions a wireless processing path into separate wireless processing stages at the RRH and/or the BBU. Block 512 may be followed by block 516 that recites "retrieving a plurality of coefficients from a memory database." As described herein, any of the processing units at the RRH and/or the BBU may retrieve coefficients for mixing with input data; for example, utilizing a memory look-up unit. For example, the memory look-up unit may store associations between coefficients and wireless protocols and/or configuration modes described herein. For example, the processing unit may request the coefficients from a memory part of the implementing reconfigurable fabric, from a memory part of an external computing device, or from a memory implemented in a cloud-computing device. In turn, the memory may send the plurality of coefficients as requested by the respective processing units.

Block 516 may be followed by block 520 that recites "receiving input data for processing according to the at least one processing stage." As described herein, a BBU may receive an input data stream to be transmitted, and an RRH may receive an intermediate processing result as input data to be processed at the RRH. Or as vice versa, the RRH may receive an input data stream received at an antenna, and the BBU may receive an intermediate processing result as input data to be processed at the BBU. In either case, the input data may be received according to a format specified by the first processing stage of the processing entity, such as the RRH or the BBU. In an example, if the first processing stage of an RRH is a massive MIMO processing stage, then the RRH may receive the input data in a format as output by a waveform processing stage, such as data in a FBMC format. Block 520 may be followed by block 524 that recites "mixing the input data using the plurality of coefficients." As described herein, the processing unit utilizes the plurality of coefficients such that mixing the coefficients with input data generates output data that reflects the processing of the input data with coefficients by the circuitry of FIG. 2. For example, various ALUs in an integrated circuit may be configured to operate as the circuitry of FIG. 2, thereby mixing the input data with the coefficients as described herein. In some examples, various hardware platforms may implement the circuitry of FIG. 2, such as an ASIC, a DSP implemented as part of a FPGA, or a system-on-chip. Block 524 may be followed by block 528 that recites "providing output data based on the input data being mixed using the plurality of coefficients." As described herein, the output data may be provided to another entity including a reconfigurable fabric such as an RRH and/or a BBU, or an antenna for wireless, RF transmission. Block 528 may be followed by block 532 that ends the example method 500. In some examples, the blocks 508 and 516 may be optional blocks. For example, rather than receiving a configuration mode selection at block 508, execution of the control instructions may include a determination of a configuration mode based on various processing times of a computing system including entities with processing times and couplings that may include transmission times (e.g., a fronthaul link coupling the entities with processing times).

The blocks included in the described example methods 500 are for illustration purposes. In some embodiments, the blocks may be performed in a different order. In some other embodiments, various blocks may be eliminated. In still other embodiments, various blocks may be divided into additional blocks, supplemented with other blocks, or combined together into fewer blocks. Other variations of these specific blocks are contemplated, including changes in the order of the blocks, changes in the content of the blocks being split or combined into other blocks, etc.

From the foregoing it will be appreciated that, although specific embodiments of the present disclosure have been described herein for purposes of illustration, various modifications may be made without deviating from the spirit and scope of the present disclosure.

What is claimed is:

1. An apparatus comprising:
a reconfigurable fabric coupled to a fronthaul link, the reconfigurable fabric configured to receive a data stream to be transmitted according to a wireless protocol, the reconfigurable fabric comprising:
a plurality of processing units; and
a non-transitory computer readable media encoded with control instructions which, when executed by the reconfigurable fabric, are configured to cause the apparatus to perform operations comprising:
receive a configuration mode selection including information indicative of a configuration mode, wherein the configuration mode is associated with at least one wireless processing stage of a plurality of wireless processing stages;
allocate a portion of the plurality of processing units to perform the at least one wireless processing stage, wherein the at least one wireless processing stage is configured to mix coefficient data with the data stream to be transmitted according to the wireless protocol;
calculate an intermediate processing result by mixing the coefficient data with the data stream to be transmitted according to the wireless protocol, wherein the calculated intermediate processing result corresponds to the portion of the plurality of processing units performing the at least one wireless processing stage according to the wireless protocol; and
provide the intermediate processing result via the fronthaul link.

2. The apparatus of claim 1, wherein the non-transitory computer readable media is further configured to cause the apparatus to perform the operations comprising:

retrieve, at a memory look-up unit, the coefficient data based on the information indicative of the configuration mode specific to the reconfigurable fabric;
multiply, at the portion of the plurality of processing units, the data stream to be transmitted with the coefficient data to generate a processing result; and
accumulate, at the portion of the plurality of processing units, the processing result to generate the intermediate processing result.

3. The apparatus of claim 1, wherein the at least one wireless processing stage comprises at least one of a group comprising a channel coding processing stage, a modulation access processing stage, a waveform processing stage, a massive MIMO processing stage, and a filter processing stage.

4. The apparatus of claim 1, wherein the output data stream is representative of the data stream to be transmitted being processed in a wireless transceiver configured to process data streams according to the wireless protocol.

5. The apparatus of claim 1, wherein to allocate the portion of the plurality of processing units to perform the at least one wireless processing stage comprises:
determine that the portion of the plurality of processing units performs the at least one wireless processing stage at a processing time that passes a processing time threshold, wherein the processing time threshold is based on a comparison of the processing time of the reconfigurable fabric performing the at least one wireless processing stage and another processing time of another reconfigurable fabric performing the at least one wireless processing stage.

6. The apparatus of claim 1, wherein the wireless protocol is associated with at least one of GFDM, FBMC, UFMC, DFDM, SCMA, NOMA, MUSA, or FTN.

7. The apparatus of claim 1, wherein the intermediate processing result is utilized to generate an output data stream based on mixing additional coefficient data and the intermediate processing result.

8. The apparatus of claim 7, wherein mixing the additional coefficient data and the intermediate processing result is performed at another reconfigurable fabric, different than the reconfigurable fabric.

9. An apparatus comprising:
a reconfigurable fabric coupled to a fronthaul link and configured to receive, via the fronthaul link, a processing result associated with a data stream to be transmitted according to a wireless protocol, the reconfigurable fabric comprising:
a plurality of processing units; and
control instructions stored on non-transitory computer readable media encoded with executable instructions which, when executed by the reconfigurable fabric, is configured to cause the apparatus to perform operations comprising:
receive a configuration mode selection including information indicative of a configuration mode for the plurality of processing units, wherein the configuration mode is associated with at least one wireless processing stage of a plurality of wireless processing stages;
allocate the plurality of processing units to perform the at least one wireless processing stage that mixes coefficient data with the processing result associated with the data stream to be transmitted; and
generate an output data stream by mixing the coefficient data with the processing result associated with the data stream to be transmitted, wherein the output data stream corresponds to the plurality of processing units performing the at least one wireless processing stage according to the wireless protocol.

10. The apparatus of claim 9, wherein allocating the plurality of processing units to perform the at least one wireless processing stage that mixes coefficient data with the processing result comprising loading instruction sets on each of the plurality of processing units based on the configuration mode selection.

11. The apparatus of claim 9, the operations comprising: selecting the configuration mode from among a plurality of configuration modes, each configuration mode of the plurality of configuration modes associated with a respective plurality of coefficients.

12. The apparatus of claim 11, the operations comprising: retrieving the coefficient data from a memory coupled to at least one of the plurality of processing units.

13. The apparatus of claim 12, wherein the coefficient data corresponds to a non-linear mapping of input data to output data, the non-linear mapping representative of a portion of the data stream to be transmitted being processed according to the configuration mode selection.

14. The apparatus of claim 11, wherein each configuration mode of the plurality of configuration modes corresponds to an allocation of a plurality of wireless processing stages between the apparatus and another apparatus.

15. The apparatus of claim 14, wherein the allocation the plurality of wireless processing stages comprises at least one of a group comprising a channel coding processing stage, a modulation access processing stage, a waveform processing stage, a massive MIMO processing stage, a filter processing stage, and a digital front-end processing stage.

16. The apparatus of claim 9, wherein generating the output data stream based on the mixing of the coefficient data with the processing result comprises:

multiplying a portion of the processing result with one of the coefficient data to generate a coefficient multiplication result; and
accumulating the coefficient multiplication result to be further multiplied and accumulated with other portions of the processing result and additional coefficients.

17. A method comprising:
allocating a portion of a plurality of processing units to perform at least one processing stage of a plurality of processing stages based on a configuration mode;
mixing input data received at the plurality of processing units with a plurality of coefficients, the plurality of coefficients specific to the configuration mode; and
providing output data to be transmitted according to a wireless protocol by mixing the input data with the plurality of coefficients specific to the configuration mode, the output data corresponding to the input data being processed according to the at least one processing stage, wherein the output data corresponds to the plurality of processing units performing the at least one processing stage according to the wireless protocol.

18. The method of claim 17, further comprising:
receiving a configuration mode selection including a configuration for the portion of the plurality of processing units, wherein the configuration mode is associated with the at least one processing stage.

19. The method of claim 17, further comprising:
determining a configuration mode based at least on the a processing time of the plurality of processing units to the perform the at least one processing stage and a transmission time to transmit the output data via a fronthaul link.

20. The method of claim 17, further comprising:
amplifying the output data using an RF amplifier; and
transmitting the output data via an RF antenna at a frequency specified by a wireless protocol.

* * * * *